(12) United States Patent
Nokhoudian et al.

(10) Patent No.: US 9,414,212 B2
(45) Date of Patent: Aug. 9, 2016

(54) COMMUNITY EMERGENCY REQUEST COMMUNICATION SYSTEM

(71) Applicants: Viken Nokhoudian, Grants Pass, OR (US); Anis Alex Kahouch, Ashland, OR (US); Laurie Johansen, Grants Pass, OR (US)

(72) Inventors: Viken Nokhoudian, Grants Pass, OR (US); Anis Alex Kahouch, Ashland, OR (US); Laurie Johansen, Grants Pass, OR (US)

(*) Notice: Subject to any disclaimer, the term of this patent is extended or adjusted under 35 U.S.C. 154(b) by 0 days.

(21) Appl. No.: 14/298,931

(22) Filed: Jun. 8, 2014

(65) Prior Publication Data

US 2015/0358794 A1 Dec. 10, 2015

(51) Int. Cl.
*H04W 4/22* (2009.01)
*G08B 25/01* (2006.01)
*G08B 29/18* (2006.01)

(52) U.S. Cl.
CPC ............... *H04W 4/22* (2013.01); *G08B 25/016* (2013.01); *G08B 29/185* (2013.01)

(58) Field of Classification Search
None
See application file for complete search history.

(56) References Cited

U.S. PATENT DOCUMENTS

| 8,792,867 B1* | 7/2014 | Negahban et al. .......... 455/414.1 |
| 2005/0221796 A1 | 10/2005 | Pellegrino et al. |
| 2008/0175356 A1* | 7/2008 | Seidberg et al. ................ 379/45 |
| 2010/0184401 A1 | 7/2010 | Spence |
| 2011/0045847 A1 | 2/2011 | Roin et al. |
| 2011/0071880 A1* | 3/2011 | Spector ............................ 705/9 |
| 2011/0281550 A1 | 11/2011 | Peabody |
| 2013/0307685 A1* | 11/2013 | Sholder ................... 340/539.12 |

* cited by examiner

*Primary Examiner* — Daniel Lai
(74) *Attorney, Agent, or Firm* — Albert O. Cota

(57) ABSTRACT

A community emergency request communication system (CERCS) that provides a person in crisis with ability to send an emergency alert. A primary responder(s) and/or secondary responder(s) receive the alert and can provide aid to the person in crisis. The alerts are sent from a communication device such as a smart phone or cell phone through a server. The responder(s) receive the alert on a communication device and replies through the server. Additionally, personal contacts of the person in crisis can also be notified of the emergency. The system collects and stores relevant event feedback, performance and skill ratings of the responders and the persons in crisis in the system, as well as incident information. The system provides an individual and a community with an additional and/or alternative emergency response capability, which may provide faster or more reliable emergency response than other conventional emergency response methods under some circumstances.

3 Claims, 2 Drawing Sheets

COMMUNITY EMERGENCY REQUEST COMMUNICATION SYSTEM

This application claims priority of Provisional Patent Application 61/832,385 filed Jun. 7, 2013.

TECHNICAL FIELD

The invention generally pertains to emergency notification systems and more particularly to a CERCS wherein data transfer is initiated by a person in crisis and is broadcast to a group of volunteer and/or professional responders to facilitate assistance in the event of an emergency situation.

BACKGROUND ART

A person in crisis has several ways to call for help, such as the 911 emergency system which is intended to being public safety officers and/or professional medical responders as quickly as possible. Unfortunately, the police may be at a considerable distance, resulting in long response times, or may not respond at all in under-staffed precincts. Medical rescue personnel may also be far away and unable to render aid quickly. In underserved areas, first aid promptly applied by someone nearby could mean the difference between life and death. Similarly, in the event of a violent crime in progress, the timely arrival of help to the victim can be life saving.

For medical emergencies, many systems exist in which a pendant or wall button alerts a radio receiver provided to an individual by the company. Providers include Bay Alarm Medical, Life Alert and ADT. The range of these radio devices extends, in most best-case scenarios, to 1000 feet. Coverage is limited by the range of the company's installed receivers. In turn these receivers are connected to phone lines, or through dedicated cell services. This service comes at a high monthly cost to the user because of the infrastructure required to support the system. Systems like this are represented by several publication patent applications. (Peabody US2011281550, Spence US2010184401, and Pellegrino US2005221796).

Similarly there are buttons that call for police assistance which are handled by ADT and other security companies. These buttons also have the same limitation of range from the base receiver that the medical alert systems do, and the same expensive infrastructure costs. They also have the limitation that they depend on the proximity and availability of public safety personnel. There are also systems that have been made using multiple cameras coordinated by central locations manned and, operated by law enforcement officers as described in Thomas US201079649. However, these are command and control top down systems, and do not facilitate a bottom-up locally networked community volunteer response.

The inevitable delays and limited availability of response from public safety officers is a problem. The cost of having professional guards is also usually prohibitive. Therefore communities have sometimes formed neighborhood watch groups so that members of the community can watch for criminal activity and then notify police and warn other members of the watch. They currently generally employ telephones and radios to issue a request for assistance and alert. However, this system is cumbersome and prone to inefficiency in contacting and coordinating an appropriate response. Furthermore, current emergency alert systems generally rely on voice transmission entirely, which limits emergency response to times and locations with adequate cell phone reception to understand voices.

The existing systems also do not allow for the efficient collection and storage of information associated with the emergency that could prove crucial in the crime analysis or in the determination of an appropriate response.

There are also systems which broadcast alarms to communities via cellphone in the event of a natural disaster such as a tornado, power outage, or earthquake, as well as man-made disasters such as terrorism. Individuals are contacted and informed of the emergency based on their location. Amber alerts also broadcast alarms to individuals based in part on their location. One publication patent application in particular broadcasts via cellphone text to the deaf community based on their proximity to a natural disaster (Roin et al. US 2011045847).

The current means of notifying individuals of an emergency does not allow for immediate response from someone nearby nor does it allow for coordination between local community members who wish to assist. It does not provide the information system solution that is needed for optional signaling of alarm, coordination of local response, nor storage of relevant information needed to properly analyze and optimize an appropriate response in real time.

To improve emergency response service and reach an appropriate group of local responders, a system facilitating community support for emergencies is needed. It should operate on ubiquitous smart phone or cell phone hardware, devices taking advantage of cell and WiFi coverage, and web browsers via internet service providers and cable. Delivery of assistance requests would be based on geo-location and type of emergency as well as voluntary participation in responder groups, to ensure the individual in crisis receives the most prompt response.

DISCLOSURE OF THE INVENTION

The CERCS system allows greater flexibility, improved response time, and better coverage than existing systems by providing a community based distributed information and communication system specifically designed to assist in the event of an emergency.

The CERCS features includes:
1) The ability to send an alert from a person in crisis to a select group of primary responders who are well known to and trusted by one another. This group is referred to herein as a primary responder group (PRG).
2) An emergency alert may also be broadcast to other users within a specified range who are willing to respond to general, non-responder group help requests. These individuals are referred to herein as a secondary responder group (SRG).
   a) The system starts by broadcasting the emergency alert to all members in the primary responder group (PRG) and the secondary responder group (SRG),
      (1) The general request delivery starts at a small radius from the person in crisis, then increases range based on GPS location, to ensure that the emergency alert is received by responders in the area, and
      (2) The general request will also increase range over time if no one that receives the request for aid has alerted the system that they will respond.
3. Security and medical response agencies (both public and private) may join the CERCS system as a primary or secondary responder to monitor for all emergency alerts in their areas.

4. Stadiums or other facilities hosting special events can allow visitors to join a temporary responder group for that event and to send incident alerts to the event security team.
5. Responders are connected by voice communication with each other and with the person in crisis for real-time coordination. The system tracks and records all communications for later review by law enforcement, etc.
6. Responders are notified of the type of emergency (criminal, medical or rescue) to adjust their response strategy and self-select for the most appropriate responders with the right skill set.
7. Responders are provided a map/or display indicating the location of the person in crisis. Responders also have the option to enter a navigation mode and receive street by street verbal directions for driving as well as a navigation map.
8. The person in crisis sending an emergency alert also has an additional option to maintain a list of personal contacts.
    (a) The person in crisis can opt to have any or all of their contacts automatically notified by a short message (SMS or short message service or MMS multimedia message service) in case of the emergency.
        (1) The SMS/MMS broadcast to local emergency contracts will contain a link to a server generated, on demand, information page that gives details about the type of emergency and geographic location.
        (2) A personal contact for the person in crisis may also have some foreknowledge of certain pre-existing medical condition or needs and maybe able to respond accordingly.
        (3) The database at the company operating the CERCS system may also have personalized medical information on the person in crisis stored and available to authorized responders, both volunteers and professionals.
        (4) For users without mobile devices, a computer application will provide similar functionality for the home computer. The home user's GPS location is determined by the address provided for their account. Mobile laptop users can also use a button to update their current location using Google maps or similar systems. The application can be used to send a crisis request or to receive and respond to one in a manner similar to the mobile application.
9. An institutional management application for professional responders (police, fire, rescue) will contain greater functionality than the end-user application. It will allow monitoring of multiple crisis events, forward the help requests to responders on staff and monitor location of responders and persons in crisis as well as their conversation.
10. During an emergency the person in crisis will also have one button access to make phone calls to:
    (1) Emergency 911.
    (2) Any responder who has alerted the system that they have opted to respond to current emergency request, and/or
    (3) Anyone in the emergency requester's personal contact list.
11. The system will also have a test and training mode where participants of a group can enter a training mode together to send and receive alerts that are broadcast to the participating group only, and are flagged as test only alerts.
    (a) The test and training mode will allow responders and potential responders to gain valuable familiarity with operation of the system.
    (b) An individual user can also enter into the test mode to become familiar with the system.
12. Individuals, responders, and other member organizations shall have a rating score which reflects their frequency and skill of response.
    (a) After an emergency response has concluded, participants involved will be asked to give feedback on responders on the event.
    (b) The feedback can be used to voluntarily adjust response to a person in crisis who habitually gives false alarms.
    (c) The feedback can also be used to quantitatively score a responder's skill and frequency of response to emergencies resulting in an additional social and psychological incentive for individuals to respond to emergencies.
    (d) Periodic awards and publicity including social media such as Facebook and Twitter postings may also help provide examples and incentives for people to become active and skilled responders in the CERCS system.
    (e) Special training such as first aid, firearms safety and physical fitness testing may also provide a series of scores for different relevant abilities.
    (f) The scoring system will provide social rewards and incentives for people to become effective and active responders.
13. The integrity and functionality of the system will be tested from the server.
    a) Upon receiving a crisis alert, the responders will immediately send a response to the server indicating that the alert has been received, simultaneous with notifying the person in crisis. This allows gathering of metrics by the system to determine:
        (1) Whether the application on a registered device is receiving alerts,
        (2) The response rate of the particular responder(s), and
        (3) Whether a responder keeps the application installed and running to uphold a responder's obligations.
    b) There will also be an option for the server to send out a covert test signal to a responder(s), to detect operational status of the system. This signal would not alert the responder, but would allow metrics on the system to be assessed and remedial actions taken.
14. There will also be scan-able encoded information displayed provided for special events which allow people to join a responder group for the event.
    a) Participants in a special event or settings, such as a sports arena, campground, concert, race track, or managed outdoor activity will be provided a one-time use of the CERCS system which will be coordinated by the event organizers for the duration of the event.
    b) Organizers create a special event in the system, which then provides them with an access code in the form of a quick response (QR) code, near field communication (NFC) tag data or an encoded text string sent to their device via SMS. The organizers then make this code available to the participants in the event.
    c) This can also be used by public safety professionals and volunteers to respond to temporary situations such as natural disasters (hurricane relief, earthquake relief, etc.) or for terrorist event response, or search and rescue operations.

In view of the above disclosure, the primary object of the invention is to provide a CERCS that will allow a person in crisis to send an emergency alert to responders who will receive the alert and can render aid to the person in crisis. In addition to the primary object, it is also an object of the invention to provide a CERCS that:

is easy to use,
can be used by adults and children,
is particularly helpful for homebound or physically-challenged individuals,
can bring a community together in a common effort,
can potentially save lives, and
provides security and reassurance to people.

BEST MODE FOR CARRYING OUT THE INVENTION

Figure 1:
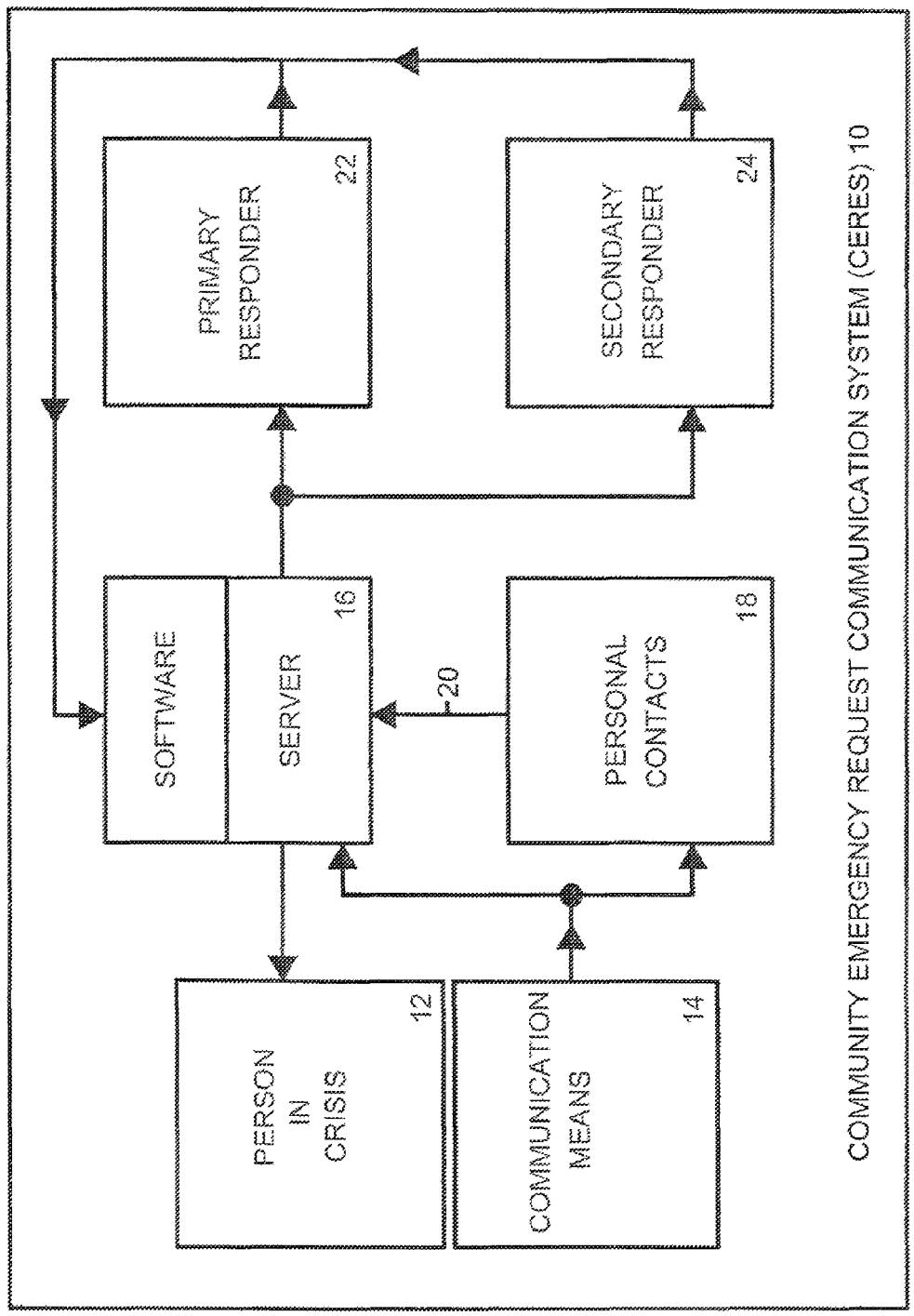
FIG. 1 is a block diagram of the basic elements that comprise the CERCS.

The best mode for carrying out the invention is presented in terms that disclose a preferred embodiment of a community emergency request communication system (CERCS). The preferred embodiment of the CERCS 10, as shown in FIGS. 1 and 2, is comprised of the following major elements: a person in crisis 12, a communication means 14, a server 16, personal contacts 18, a link 20, a group of primary responders 22 and a group of secondary responders 24.

Figure 2:
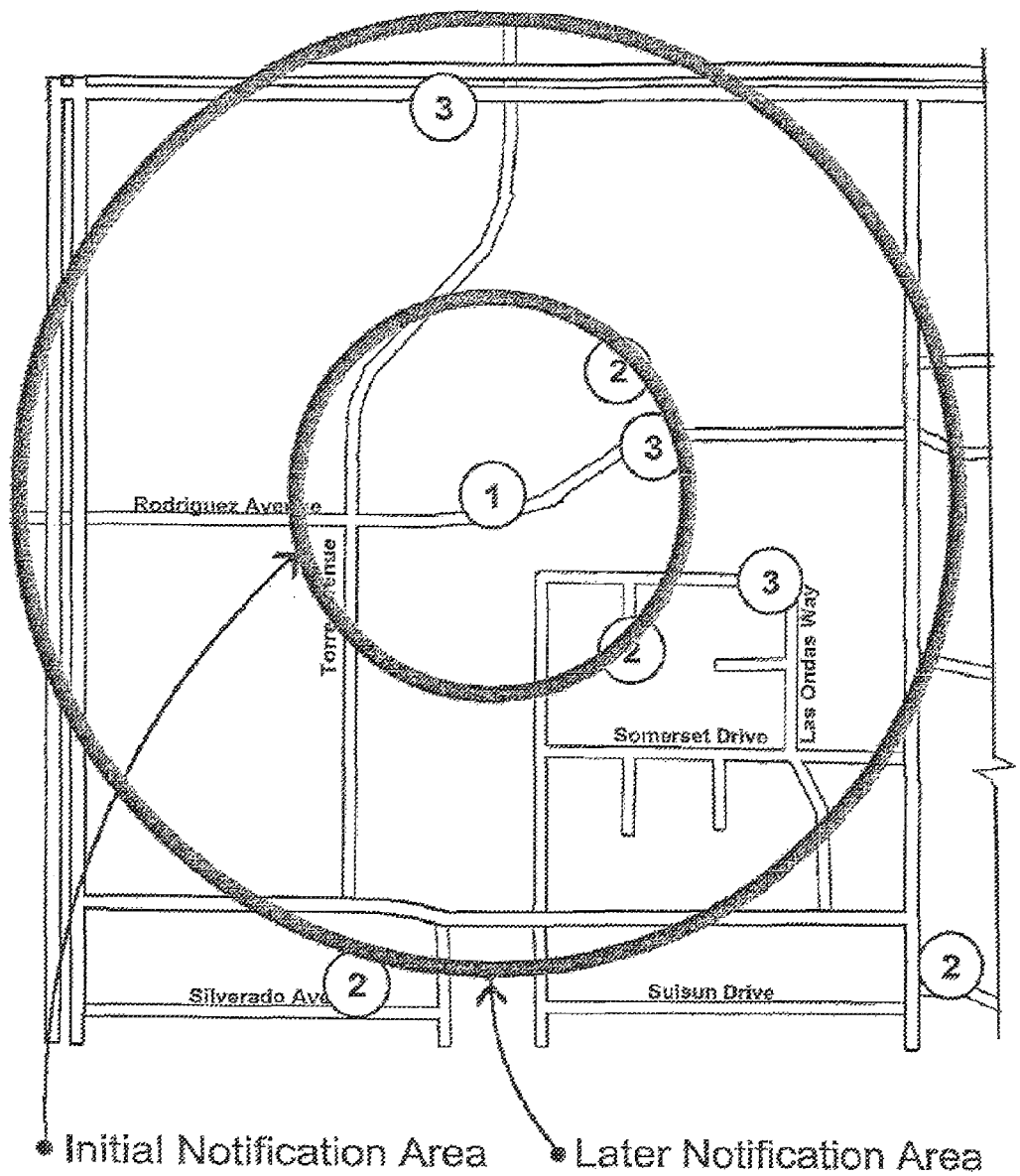
FIG. 2 is a map plan view of how the CERCS operates in the event of an emergency.

The communication means 14, as shown in FIG. 1, is utilized by the person in crisis 12 to initiate a request for aid during an emergency event such as a criminal, medical or a rescue situation. The communication means 14 includes a wireless device that includes a list of personal contact information of individuals known to the person in crisis 12. The wireless device includes an emergency alert button that when pressed by the person in crisis 12, the CERCS 10 becomes operational.

The wireless device is selected from the group consisting of a cell phone, a smart phone, a tablet computer, or a laptop computer. The smart phone as well as the tablet and laptop computers are designed to display a map showing the location of the person in crisis 12, as shown in FIG. 2. The smart phone and the tablet and laptop computers also display the identity of a responder(s) that has been called to render aid to the person in crisis 12, the distance from the responder to the person in crisis 12, and identifies the type of emergency such as criminal, medical or rescue.

The communication means can also be comprised of a dedicated communication device (not shown) that has GPS capability and software. The dedicated device can be carried like a panic button in a pocket or purse or on a lanyard placed around the neck of the person in crisis 12.

A basic overview of the system comprises in a typical emergency scenario the person in crisis 12 utilizing his or her wireless device to initiate a request for aid. The request will be sent to the server 16 and then on to the group of primary responders 22 and the group of secondary responders 24. A message which is preferably a text message will also be sent to any selected personal contact(s) 18 on the list of personal contact information. Once a personal contact 18 receives the message, he or she will be provided with a link to the server 16. If the personal contact 18 utilizes the link, he or she will be provided with information pertaining to the person-in-crisis emergency situation.

Once the group of primary responders 22 receives the request for aid, any individual primary responder who is willing and capable of providing aid will respond. The server system will note that and will supply the person in crisis with pertinent data, about the responder, such as their name, their feedback rating on the system, relevant skills and abilities, estimated time of arrival to the person in crisis 12, and any other information that is necessary or important for the particular emergency situation. Additionally, within the group of primary responders are sub-groups which can consist of multiple individuals, such as a fire fighting team, a paramedic team or a police tame, all of which can consist of at least two individuals who respond together to a request for aid.

Once the group of secondary responders 24 receives the request for aid, any individual secondary responder 24 who is capable of providing aid, and is willing to provide aid will be noted and the system will send the responder's pertinent data, such as their name, their feedback rating on the system, any relevant skills/abilities they have, the estimated time of arrival to the person in crisis, and any other information that is necessary or important for the particular emergency situation. As with group of primary responders, the group of secondary responders can also include a sub-group that consists of multiple (at least two) individuals who together respond to the request for aid.

Once the primary responder(s) 22 and/or secondary responder(s) 24 arrive at the person in crisis 12 whatever type of aid is necessary is provided.

In a more detailed description of the system, a user and the potential responders have the application on their mobile devices. When a user presses the emergency alert button, the application sends the emergency response request to the server 16. It also sends the requests via a short message service (SMS) to the person in crisis personal contact list.

The server's script receives the request containing the user's identification number and the type of help request (criminal, medical or rescue). The system 10 creates a new crisis record on the server with its own unique identification, and retrieves the responder groups in which the person in crisis 12 is a member and determines whether any of those groups handle the specified type of request. If so, the system 10 retrieves the mobile device identification numbers for all the members of that group and sends an alert via Google cloud messaging (GCM) or the equivalent.

The system 10 assumes the possibility that none of the responders 22,24 in a particular group will receive the message. It therefore looks up other responder(s) in the geographic area of the crisis and alerts them as well. The system 10 will also do this if the person in crisis 12 is not a member of any responder group.

The GCM broadcast, when received by a potential responder's device, initializes the application which then sounds an alarm and/or vibrates the device. This is repeated until the potential responder refuses the request or accepts it.

After 20 seconds, then every 10 seconds thereafter, the server checks whether any responders have confirmed that they are responding to the alert. If, after a given period of time, the system 10 discovers that nobody has responded, the system broadens the area to alert other primary responders 22 and secondary responders 24.

Any responder 22,24 who accept the aid request presses a "respond" button. A message is sent to the server with the crisis record identification to confirm response. This alerts the person in crisis 12 with information about the responder 22,24 and puts them into voice chat mode. The server 16 creates the voice chat session and begins recording it for later evaluation.

Additional responders 22,24 will also be added to the voice chat. Their application goes into map mode, showing a Google type map with a pin indicating the location of the person in crisis 12. The pin's coordinates are set by the GPS coordinates of the person in crisis 12 mobile device or by their home address if they are only using the system 10 via a web browser. The mobile laptop user may also update the user's current location by means of an update button which activates a Google type map where GPS is not available.

Once the server 16 sees a reasonable number of responders 22,24 to the crisis, it stops seeking responders. To mark a crisis as resolved, the person in crisis 12 must input a password on their mobile device or web browser. At least one responder must also enter their own password to confirm the crisis is resolved. This ensures that if the person in crisis entered their password under-duress, the system 10 does not call off the responders. The system 10 keeps track of who took specific actions, such as entering password, for later review by law enforcement etc. The person in crisis may also enter a duress password if the individual is being coerced into entering a de-activation of the alert.

From a potential person in crisis 12, perspective, the system 10 functions as follows: An individual downloads the application into his or her wireless device and becomes registered in the system 10 with their personal identification information. Once registered, they may be contacted by a local responder group to join the group. The individual may also choose to start his/her own group and invite others to join. The individual may also choose not to join any groups.

When the individual has an emergency, he or she will press the emergency alert button indicating whether the emergency is medical, criminal, or a rescue. Responders 22,24 in the area will be notified and the system 10 will put him or her in contact with those who are going to provide aid. The person in crisis 12 will have direct voice contact with the responders 22,24 and will have information on the wireless device as to how far away they are. Some responders 22,24 may be members of a group he or she joined, or they may be a person who is going to help as a good deed.

After aid is provided the alert is canceled by entering a password into the person in crisis 12 wireless device, along with the password of one of the responders 22,24. Instead of a password, the person in crisis may enter a duress code that will appear on their app to cancel the alert, but all responders will be notified that the duress code was entered. Thus the person in crisis can covertly indicate that they have been forced to try to call off the alert under duress from an attacker.

Later there is an automated debriefing session where feedback on the performance of all the individuals involved is recorded for feedback and ratings. The session is recorded so law enforcement or other appropriate entities may have recordings or access to the stored information.

The most common anticipated use of the system 10 is through a smart phone or cell phones, however an alert can also be initiated by use of a web browser or wireless communication device. The system 10 software would be in the form of an application that would be downloaded into a computer and utilized from there with a mouse and keyboard. In lieu of a GPS location, the registered home address of the computer user would be used for location information. For a mobile user with a laptop, the user's current location can be selected using Google maps or something similar in function. In the case of a telephone, the registered location of the phone would be used. Instead of using a computer keyboard and mouse, the caller would be requested to press phone buttons to access and activate the system 10.

Additionally, instead of a smart phone or cell phone, a dedicated communication device could be utilized which already has the GPS capability and software for the CERCS encoded into it. The dedicated communication device could be carried like a panic button in a pocket or purse, or on a lanyard around the neck. The device could also be incorporated or attached to a vehicle including, but not limited to a car, airplane, boat or bicycle.

Participants in a special event or settings, such as a sports arena, campground, concert, race track, or managed outdoor activity will be provided a one-time use of the system 10 coordinated by the event organizers. Organizers create a special event in the system 10, which then provides them with an access code in the form of a quick response (QR) code, near field communication (NFC) tag data or encoded text string. Participants in the event can be provided with the event code on brochures, via scannable NFC tags or even a uniform resource locator (URL) sent to their phone via SMS.

The user's device will be prompted to download and install the software application and to use it for reporting incidents for the one event or setting. The special event usage will be terminated after a period of time, such as two hours after the end of a game or some other predefined period. The user will be prompted to register an account to continue using the application for general-purpose crisis requests.

A link to download and install the application can be provided via scannable codes, NFC, SMS or other means for non-event purposes as well. For example, a neighborhood watch group's posters may contain the QR code to download the application and join their group.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A community emergency request communication system (CERCS) comprising a communication means utilized by a person in crisis to make a request, via an electronic communication device, for assistance during a crisis, wherein the request is routed through a server running proprietary software to a responder, wherein said responder, produces a response that is routed through said server to the person in crisis, said electronic communication device having means for:
   a) displaying a map showing a location of the person in crisis,
   b) displaying an identity of a responder and a distance from the person in crisis,
   c) identifying an emergency,
   d) displaying relevant system feedback rating information pertaining to the person in crisis, and
   e) displaying relevant system feedback rating information pertaining to the responder.

2. The CERCS as specified in claim 1 wherein said communication means having a direct communication link between the responder and the person in crisis.

3. The CERCS as specified in claim 1 wherein said server notifies the responder at increasing distances communicating from the location of the person in crisis until said responder has received the request for assistance.

\* \* \* \* \*